Patented Aug. 8, 1933

1,921,856

UNITED STATES PATENT OFFICE 1,921,856

PRODUCTION OF GASEOUS MIXTURES CONTAINING HYDROGEN AND NITROGEN FROM METHANE

Gustav Wietzel, Ludwigshafen-on-the-Rhine, and Georg Schiller, Mannheim, Germany, assignors to I. G. Farbenindustrie Aktiengesellschaft, Frankfort-on-the-Main, Germany, a Corporation of Germany No Drawing. Application February 14, 1929, Serial No. 340,016, and in Germany April 21, 1928

4 Claims. (Cl. 23—212)

This invention relates to improvements in the manufacture and production of gaseous mixtures containing hydrogen and nitrogen from methane and in particular of such gaseous mixtures suitable for the synthesis of ammonia.

It is known that mixtures of hydrogen and carbon monoxide, which contain less than 1 per cent of methane can be obtained from methane or gases containing methane such as natural gas, coke furnace gas and the like, all of the said gases being hereinafter referred to as "gases comprising methane", by treating the same with steam at elevated temperatures. Catalysts may also be employed in the said process such as those comprising nickel, iron or cobalt, which metals are hereinafter referred to as "metals of the iron group", activated for example by additions of difficultly reducible metal oxides such as alumina. When catalysts are employed, lower temperatures can be employed than without the employment of catalysts. Thus with the employment of catalysts the temperatures usually range between about 650° and 1000° centigrade, whereas without catalysts temperatures above this range must be employed, for example of between about 1000° and 1300° centigrade and preferably of about 1200° centigrade.

In order to produce the heat necessary for this conversion it has been suggested to burn a portion of the methane with oxygen or air, by adding to the mixture of methane and steam a quantity of oxygen or air which is insufficient to cause complete combustion to carbon dioxide and water, but which is usually equal to or less than that required according to the equation $2CH_4 + O_2 = 2CO + 4H_2$ with the said portion of methane.

The temperature required can also be produced by exterior heating, for example, by passing the methane and steam through tubes or other suitably shaped chambers filled with very active catalysts such as the activated catalysts mentioned above, in which chambers the gases are heated to the requisite temperature for example, of between about 650 and 750° centigrade from the exterior.

We have now found that it is frequently preferable in the production of hydrogen or gases containing it from methane or gases containing methane by means of steam to regulate the working conditions in this process, namely the temperature, the amount of steam and the rate of flow of the gases, in such a manner that there is still an appreciable quantity of methane, for example 2 to 15 per cent and usually about 4 to 5 per cent remaining in the gas obtained and subsequently removing the residual methane in any other suitable manner, for example by washing with solvents under pressure, or by decomposition with air or with air rich in oxygen and the like. The said incomplete decomposition with steam is attained, in particular by operating at a temperature lower than that at which the aforesaid process is carried out, such reduction of the temperature usually being by about 100° centigrade and, if desired, also reducing the amount of steam introduced or increasing the rate of flow of the gases or any of the steps combined. The most suitable conditions may be ascertained in each case by a simple test. The said treatment with steam may also be carried out under pressure, or, if desired, under reduced pressure.

We have found that the said method of working is particularly well adapted for the production of mixtures of hydrogen and nitrogen, and in particular of such gaseous mixtures suitable for employment as initial materials in the synthesis of ammonia, if by the process in which the residual methane is removed the requisite amount of nitrogen is introduced into the gas mixture.

If it be desired to remove the residual methane by washing, it is preferable first to convert the greater part of the carbon monoxide present into carbon dioxide and hydrogen by means of steam, and then to treat the gaseous mixture so obtained, preferably under pressure, with solvents. A particularly advantageous method of removing methane and carbon monoxide is by washing the compressed gas, preferably previously freed from carbon dioxide, at low temperatures with liquid nitrogen. In this way by the process adapted for the removal of methane, nitrogen is introduced into the gas, so that a gas mixture suitable for catalytic conversion into ammonia can be at once obtained.

The residual methane can also be removed from the resulting gas by conversion with air or oxygen. In this case oxygen or air, or air enriched with oxygen, preferably preheated, is added to the hot gaseous mixture still containing methane after it has left the reaction chamber which is heated from the exterior, in such quantities that the heat of combustion is sufficient to convert the methane present. Catalysts such as those comprising iron or nickel or cobalt may be employed, if desired. After the conversion of the carbon monoxide with steam, the carbon dioxide and the residual carbon monoxide are removed in any known manner. By employing air or air enriched with oxygen for the removal of methane in the process according to the present invention, mixtures of nitrogen and hydrogen are obtained which are well adapted for the synthesis of ammonia.

The process according to the present invention has the great advantage that, since lower temperatures can be employed than when a gas is to be produced directly containing only little methane, the material of the apparatus which particularly in the first stage of the process may be constructed of alloy steels, such as those marketed by the firm of Krupp under the trade-marks Nicrotherm, WT2 or V2A, does not suffer so much wear owing to the heat treatment as in the processes hitherto employed in which gases containing less than 1 per cent of methane are obtained directly. The said process has the further advantage that thicker layers of catalysts and a greater velocity of flow can be employed, than when the operation is carried out under such conditions that gaseous mixtures containing less than 1 per cent of methane are obtained directly.

The following examples will further illustrate the nature of the said invention, but the invention is not restricted to these examples.

*Example 1*

100 cubic meters of methane and 200 kilograms of steam per hour are passed through 10 tubes, each of which is about 15 centimeters wide and 3 meters long, constructed of a highly alloyed steel marketed by the firm of Krupp under the trade-mark "Nicrotherm 3" which is filled with coarse lumps of a catalyst prepared from aluminium hydroxide and nickel oxide. The tube is heated from the exterior to about from 800° to 1000° centigrade, the temperature of the catalyst being about 500 to 650° centigrade. About 380 cubic meters of a gas having approximately the following composition are obtained:—11 per cent of $CO_2$, 73 per cent of $H_2$, 9 per cent of CO, 5 per cent of $CH_4$ and 2 per cent of $N_2$. This gas mixture, which is at about from 500° to 600° centigrade and which contains an excess of steam is then mixed with 110 cubic meters of air, and then the gas, which becomes much hotter on account of the combustion which sets in, is passed over a layer of catalyst which is isolated to prevent loss of heat. About 440 cubic meters of a gas mixture are obtained which contain less than 0.5 per cent of $CH_4$, 8 per cent of $CO_2$, 60 per cent of $H_2$, 12 per cent of CO and the remainder of $N_2$; this mixture may be employed at the initial gas for ammonia synthesis after conversion of the carbon monoxide with steam and removal of the carbon dioxide and traces of carbon monoxide.

What we claim is:—

1. In the production of gases comprising hydrogen by treatment of gases comprising methane with steam, the step of regulating the temperature, the amount of steam and the rate of flow of the gases in such a manner that from 2 to 15 per cent of methane remain in the gas obtained, and then removing the methane from the gaseous mixture thus obtained by conversion with a gas comprising oxygen.

2. In the production of gases comprising hydrogen by treatment of gases comprising methane with steam, the step of regulating the temperature, the amount of steam and the rate of flow of the gases in such a manner that from 2 to 15 per cent of methane remain in the gas obtained, and then removing the methane from the gaseous mixture thus obtained by conversion with air.

3. In the production of gases comprising hydrogen by treatment of gases comprising methane with steam, the step of regulating the temperature, the amount of steam and the rate of flow of the gases in such a manner that from 2 to 15 per cent of methane remain in the gas obtained, and then removing the methane from the gaseous mixture thus obtained by conversion with a preheated gas comprising oxygen added to the hot gaseous mixture still containing methane after it has left the reaction chamber.

4. In the production of gases comprising hydrogen by treatment of gases comprising methane with steam, the step of regulating the temperature, the amount of steam and the rate of flow of the gases in such a manner that from 2 to 15 per cent of methane remain in the gas obtained, and then removing the methane from the gaseous mixture thus obtained by conversion with a gas comprising oxygen in the presence of a catalyst comprising a metal of the iron group.

GUSTAV WIETZEL.
GEORG SCHILLER.